United States Patent

Tseng

[11] Patent Number: 6,118,934
[45] Date of Patent: Sep. 12, 2000

[54] SAFETY PROTECTION STRUCTURE FOR AQUARIUM HEATER

[76] Inventor: Chuan-Tseng Tseng, No. 73, Sec. 1, Chung-Cheng Rd., Hu-Kou Hsiang, Hsin-Chu Hsien, Taiwan

[21] Appl. No.: 09/190,263

[22] Filed: Nov. 12, 1998

[30] Foreign Application Priority Data

Nov. 14, 1997 [CN] China .................................. 86219079

[51] Int. Cl.⁷ .............................. H05B 3/40; H05B 3/02; H05B 1/02

[52] U.S. Cl. ........................... 392/503; 219/481; 219/510

[58] Field of Search ..................... 392/503, 498, 392/497, 507; 219/481, 482, 490, 494, 507, 510, 523, 542

[56] References Cited

U.S. PATENT DOCUMENTS

3,371,192   2/1968   Rosenel .................................... 219/523
5,042,426   8/1991   Platt et al. .............................. 119/245

Primary Examiner—Teresa Walberg
Assistant Examiner—Thor Campbell
Attorney, Agent, or Firm—Dougherty & Troxell

[57] ABSTRACT

A safety protection structure for aquarium heater, including an anti-corrosion tube body in which an insulative receptacle, an electric heater, a thermal control switch, an anti-oxidation heat conductive layer, a grounding mechanism and multiple water-sealing members are disposed. The safety protection structure serves to protect the heater from leakage of electricity, blowing up due to abruptly increasing temperature after separated from the water and burning of environmental articles by over-heated surface of the heater after separated from the water.

5 Claims, 9 Drawing Sheets

SAFETY PROTECTION STRUCTURE FOR AQUARIUM HEATER

BACKGROUND OF THE INVENTION

The present invention relates to a safety protection structure for aquarium heater, which is able to protect the heater from leakage of electricity, blowing up due to abruptly increasing temperature after separated from the water and burning of environmental articles by over-heated surface of the heater after separated from the water.

Figure 1:
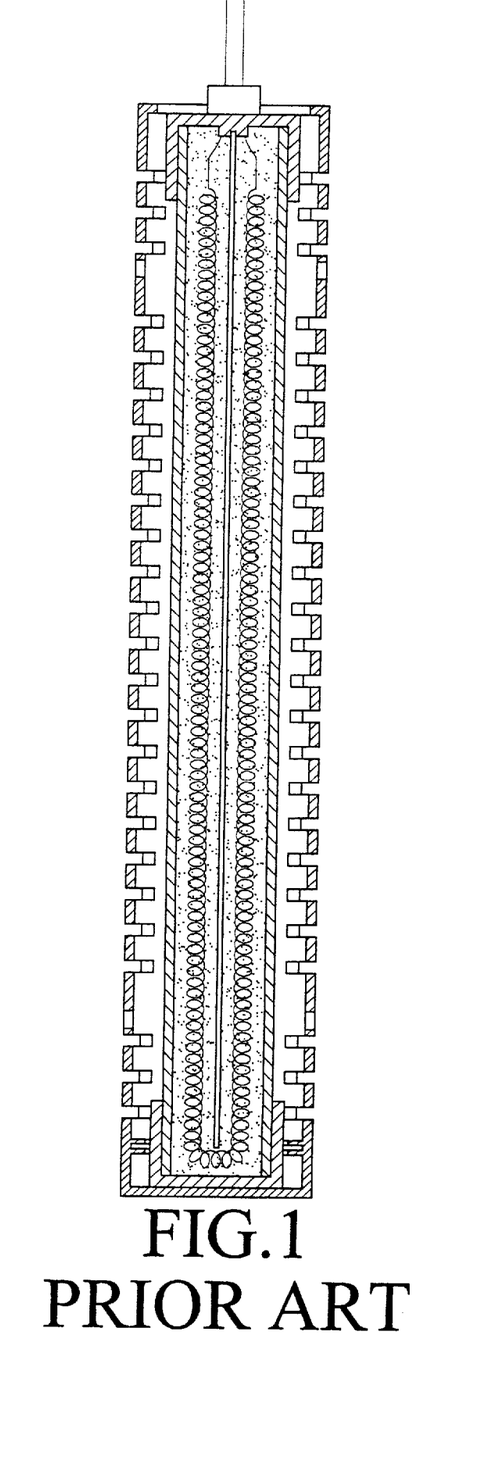
FIG. 1 is a sectional assembled view of a conventional aquarium heater.
Figure 2:
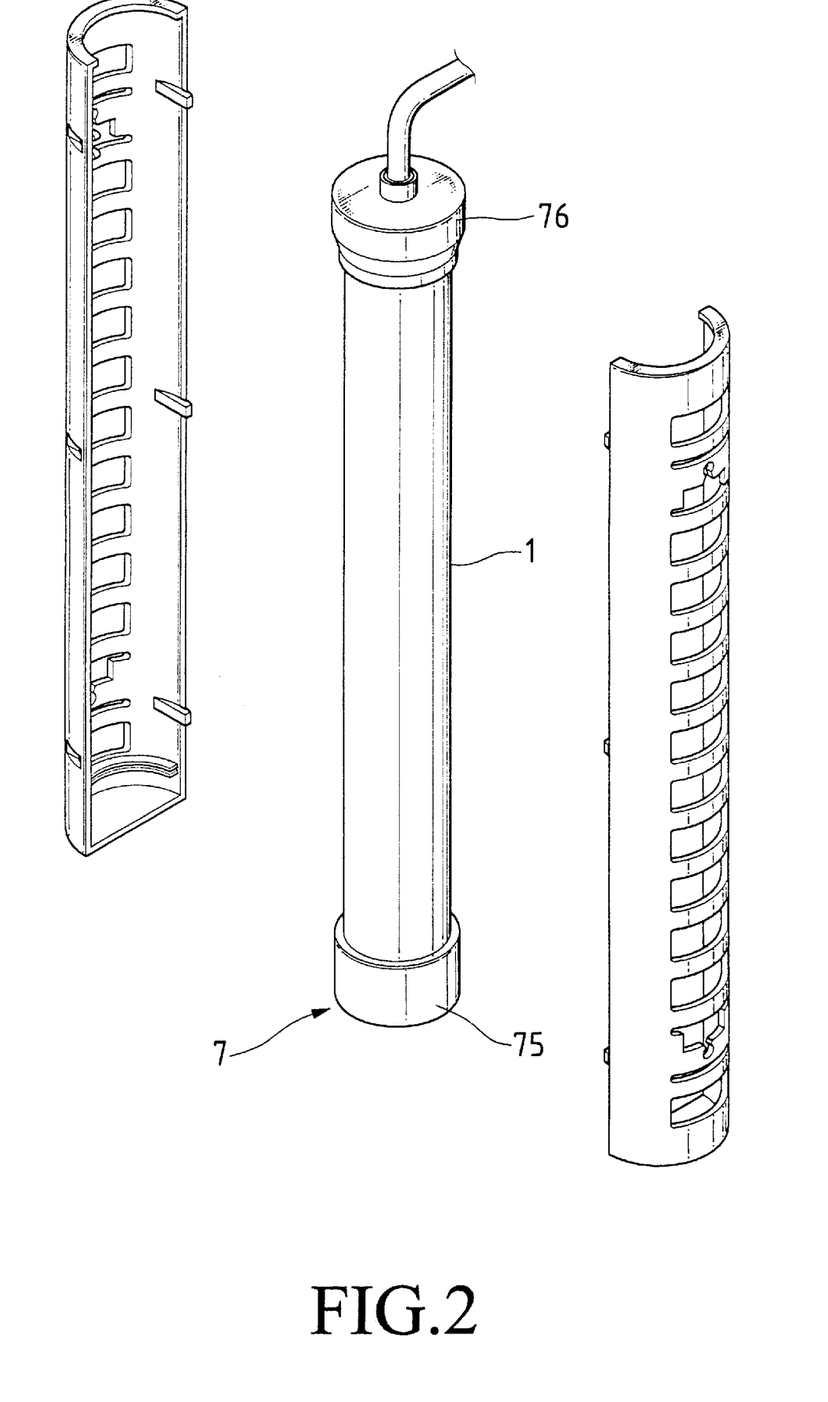
FIG. 2 is a perspective view of the present invention.
Figure 3:
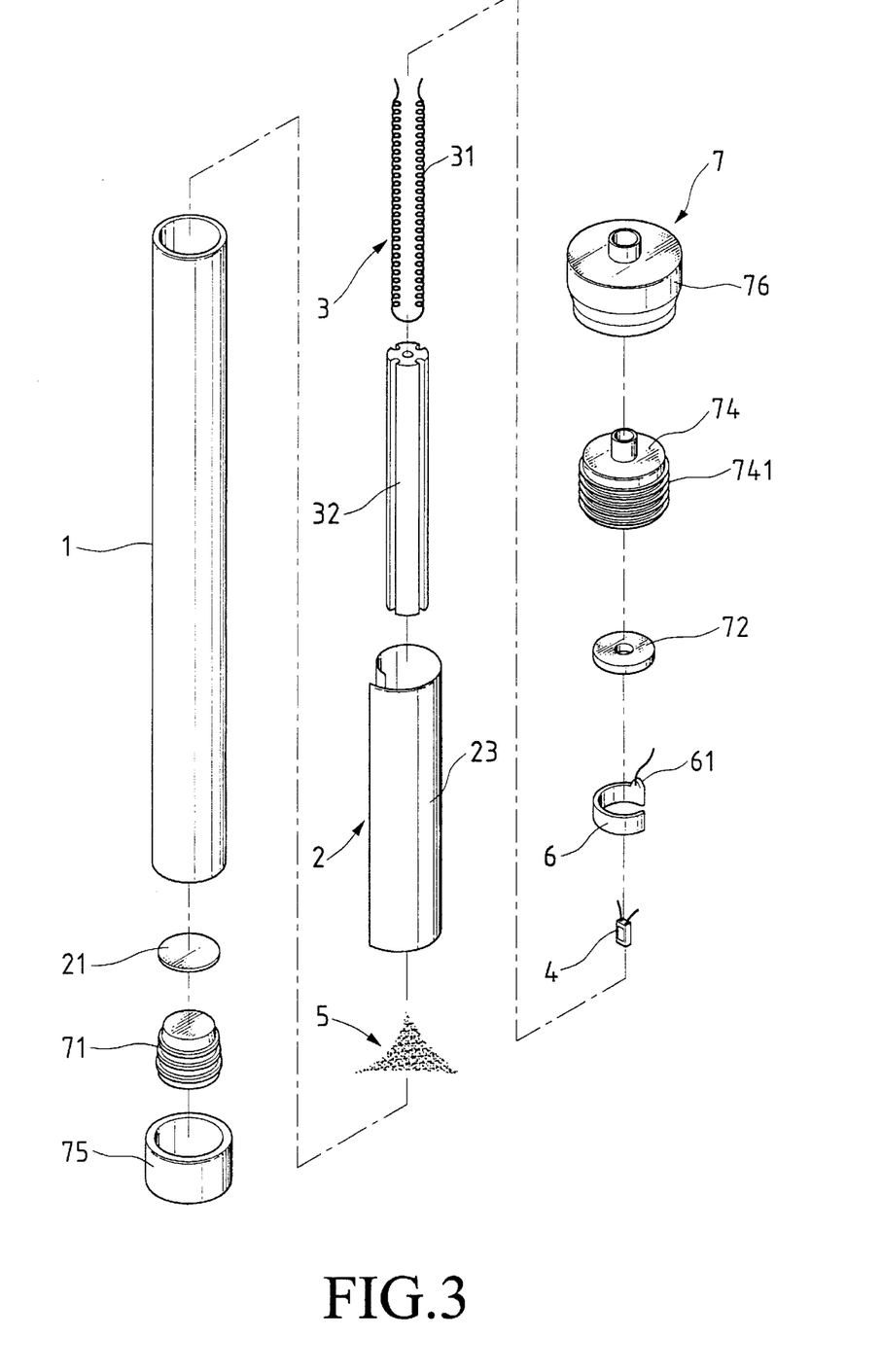
FIG. 3 is a perspective exploded view of the present invention.

It is known that it is important to properly keep constant the water temperature in an aquarium. Effective temperature control can avoid disease or death of water fowl. A conventional heater is widely used to heat the water in an aquarium. Such heater includes a heating coil and a bimetal heating circuit which are received in a glass test tube. The activation time of the heating coil is controlled by means of adjusting the contact distance of the bimetal plate. In the case of over-low water temperature, the heating coil is automatically activated to heat the water. Many kinds of improved aquarium heaters have been developed. However, all these devices can only provide an approximate temperature and can hardly accurately control the temperature. This is insufficient for some specific aquariums. Therefore, a thermostat has been developed, which via electronic technique more accurately detects temperature and controls the heating time. The thermostat is composed of an independent temperature controlling circuit and an independent heater. FIG. 1 shows a conventional heater in which a mica plate is placed at the center of the heating coil to separate two halves of the heating coil. The heating coil with the mica plate is positioned in a quartz tube which is high temperature-resistant. The interior of the quartz tube is filled with magnesium oxide and sealed at one end by a cap to avoid oxidation of the heating coil and conduct the heat. The heating wire is extended out from the other end which is sealed by a cap. Such structure can achieve an excellent heating effect to efficiently increase the water temperature in the aquarium. However, in use, it should be particularly noted that a protective housing must be fitted around the heater. Otherwise, the high temperature of the surface of the heater is very likely to bum the water fowl in the aquarium. In addition, the conventional heater has some shortcomings in operation as follows:

1. In use, the heater must be kept immersed in the water. In case the heater is moved from the water in a heating state, the temperature will abruptly increase. If the heater is then again placed into the water, the difference in temperature of inner and outer sides will lead to cracking fissures of the heater. The fissures are normally extremely fine and can be hardly seen. However, the water can infiltrate through the fissure to cause leakage of electricity and danger of shock.

2. In the case that the heater is cracked and moved from the water in a continuously heating state, the water accumulating in the heater will be vaporized to blow up and damage the heater.

3. After the heater is separated from the water, the externally added electronic sensor fails to detect such situation in time and the heater will continuously heat. As a result, the temperature of the surface of the heater will very soon reach over 200° C. This often leads to burning of environmental articles and fire accident.

SUMMARY OF THE INVENTION

It is a primary object of the present invention to provide a safety protection structure for aquarium heater, which is able to avoid leakage of electricity and protect the heater from continuously heating and blowing up due to abruptly increasing temperature after separated from the water.

It is a further object of the present invention to provide the above safety protection structure which is able to turn off the heater after separated from the water and avoid over-heating.

It is still a further object of the present invention to provide an aquarium heater equipped with the above safety protection structure in which a microcomputer is used to detect the water in the aquarium.

According to the above objects, the safety protection structure of the present invention includes an anti-corrosion tube body in which an insulative receptacle, an electric heater, a thermal control switch, an anti-oxidation heat conductive layer, a grounding mechanism and multiple water-sealing members are disposed. The tube body is made of one of titanium and stainless steel. The bottom and inner wall of the tube body are disposed with isolating insulative plate and surrounding insulative sheet for defining an insulative receptacle for receiving the heater and the thermal control switch. The electric heater is formed by a heating film wound around a ceramic bar. The heater is controlled by the thermal control switch to be turned on or off. The thermal control switch is preferably separately disposed above and adjacent to the electric heater for controlling the heating timing of the heater.

The present invention can be best understood through the following description and accompanying drawings, wherein:

DETAILED DESCRIPTION OF THE PREFERRED EMBODIMENTS

Figure 4:
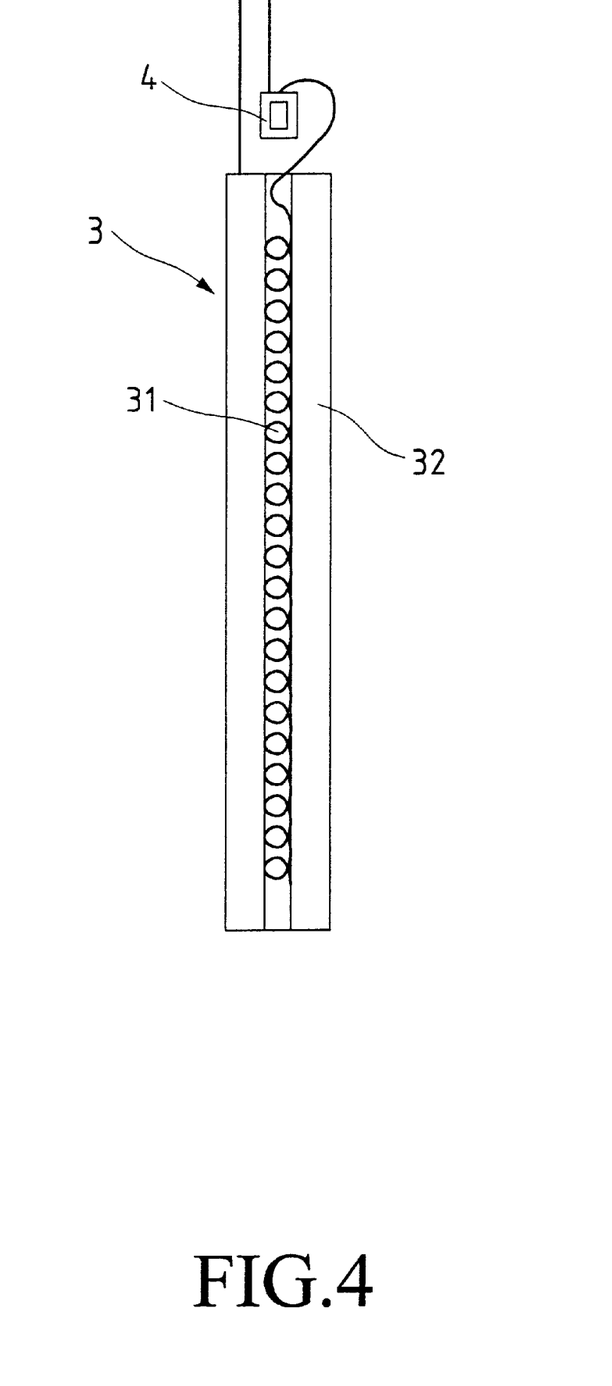
FIG. 4 shows that the thermal control switch of the present invention is disposed above the heater.

Please refer to FIGS. 2 to 5. The aquarium heater of the present invention includes: a titanium tube 1 having two open ends for receiving components of the heater; an insulative receptacle 2 disposed in the titanium tube 1 and having a mica plate 21 corresponding to the inner diameter of the titanium tube 1 and a thin mica sheet 23 which is rolled to define an insulative layer; an electric heater 3 formed by a heating film 31 wound around a ceramic bar 32, the heater 3 being controlled by a thermal control switch 4 to be turned on or off; a thermal control switch 4 which is a bimetal switch serially connected with the electric heater 3, the thermal control switch 4 being separately disposed above the heater 3 as shown in FIG. 4 and adjacent to the heater so as to achieve an accurate detecting effect; an anti-oxidation heat conductive layer 5 disposed in the insulative receptacle 2 in which magnesium oxide powder is filled to coat the heater 3 and the thermal control switch 4; a grounding mechanism 6 formed by an electrically conductive plate bent into a C-shaped collar with a diameter larger than the inner diameter of the tube, the collar having a wire connecting section 61 for fixing the grounding wire; and multiple water-sealing members 7 including conic cock 71, upper isolating plate 72, upper and lower reinforcing layers 73, 73', upper and lower sealing caps 74, 75 and outer cap 76 for water-sealing the titanium tube 1.

Figure 5:
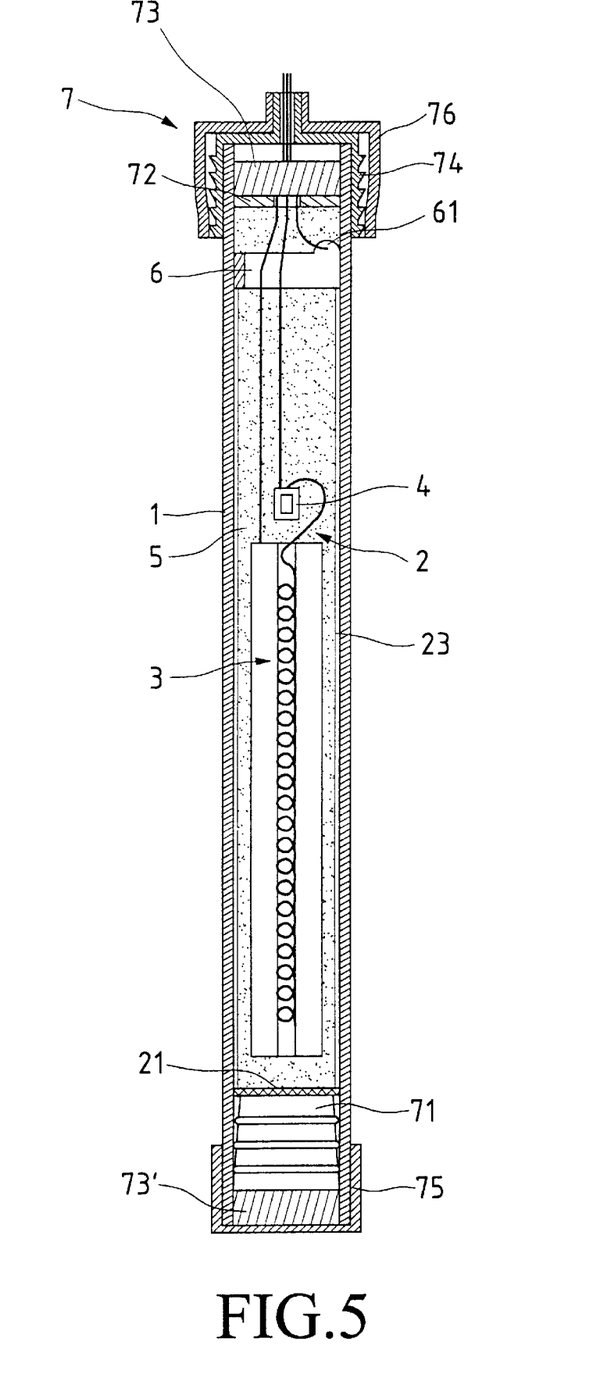
FIG. 5 is a sectional assembled view of the present invention.

As shown in FIG. 5, when assembled, the conic cock 71 is plugged into rear end of the titanium tube 1 and fixedly sealed by silicone. A lower reinforcing layer of silicone 73' with 10–13 mm thickness is filled under the conic cock 71. The lower sealing cap 75 is further tightly fitted around the tube and sealed by silicone. A 0.5 mm circular mica plate 21 is overlaid on the conic cock 71 and the 0.05 mm thin mica sheet 23 is rolled into a cylindrical shape and placed into the tube. The thin mica sheet 23 will naturally stretch to form an inner insulative wall defining the insulative receptacle 2. After located, the electric heater 3 and the thermal control switch 4 are together placed into the tube. Then the grounding mechanism 6 is placed thereabove to naturally stretch and tightly attach to inner wall of the tube. Then the tube is filled with magnesium oxide powder to coat the heater 3 and thermal control switch 4 into a compact anti-oxidation heat conductive layer 5. The upper isolating plate 72 having a hole is positioned on the layer 5 to isolate the same. Then silicone is filled in to form an upper water-sealing reinforcing layer 73 with a thickness of 10–13 mm. Finally, the upper sealing cap 74 with a wire outlet is tightly sealed by silicone. Then the outer cap 75 is fixedly fitted around multiple soft annular ribs 741 of the upper cap 74 to form a complete heater.

Figure 6:
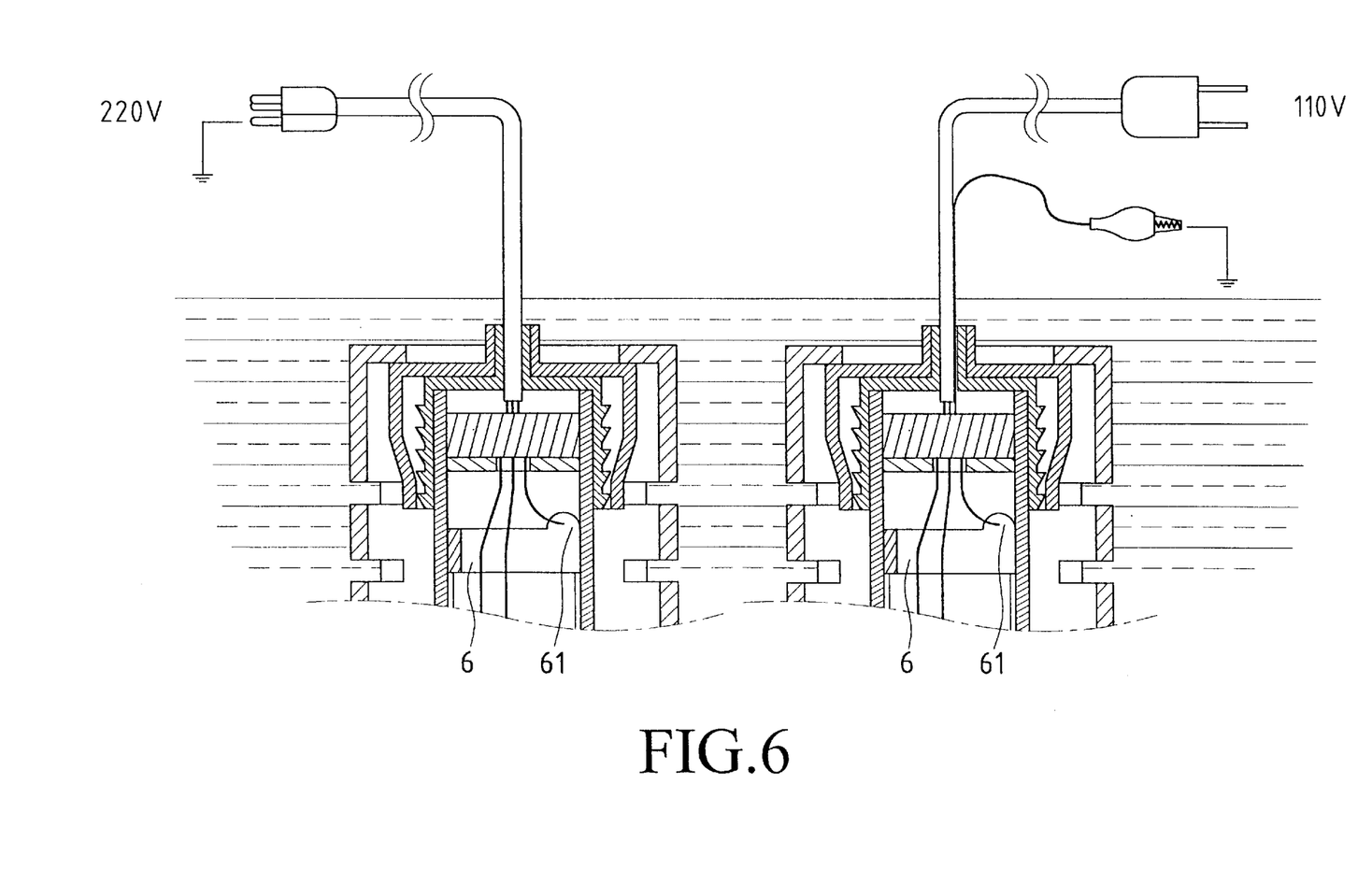
FIG. 6 shows that the present invention is grounded via the grounding mechanism.

Please refer to FIGS. 1, 5 and 6. The heater of the present invention is made of the titanium tube 1 which can be durably used in the water without corrosion. Moreover, the metal tube body will not crack when moving into or out of the water. In addition, the grounding mechanism 6 serves to ground the heater, whereby after a long period of use, in case leakage of electricity takes place due to poor water-sealing, the electricity can be conducted and dissipated so as to avoid shock accident. In addition, the thermal control switch 4 is directly disposed above and adjacent to the heater 3 for detecting the temperature, whereby a better control of temperature change is achieved. Once the heater is separated from the water and the internal temperature abruptly increases to a certain extent, the thermal control switch 4 will detect the temperature and turn off the heater 3. Therefore, it will not take place that the heater continuously heat to damage itself Moreover, a housing is fitted around the heater so that the temperature of the surface attaching to any article can be reduced to be below 100° C. This avoids burning of other articles and ensures safety.

In practice, the present invention can be made with different specifications to meet the requirements of different sizes of aquariums. For example, a small aquarium uses a heater with a total power of 50 W–100 W employing a 70° C. thermal control switch. A middle aquarium uses a heater with a total power of 200 W–250 W employing a 80° C. thermal control switch or a heater with a total power of 300 W employing a 90° C. thermal control switch. A large aquarium uses a heater with a total power of 400 W–500 W employing a 100° C. thermal control switch. It should be noted that through tests, it is proved that the present invention is able to bear 1500 volts without leakage of electricity.

Figure 7:
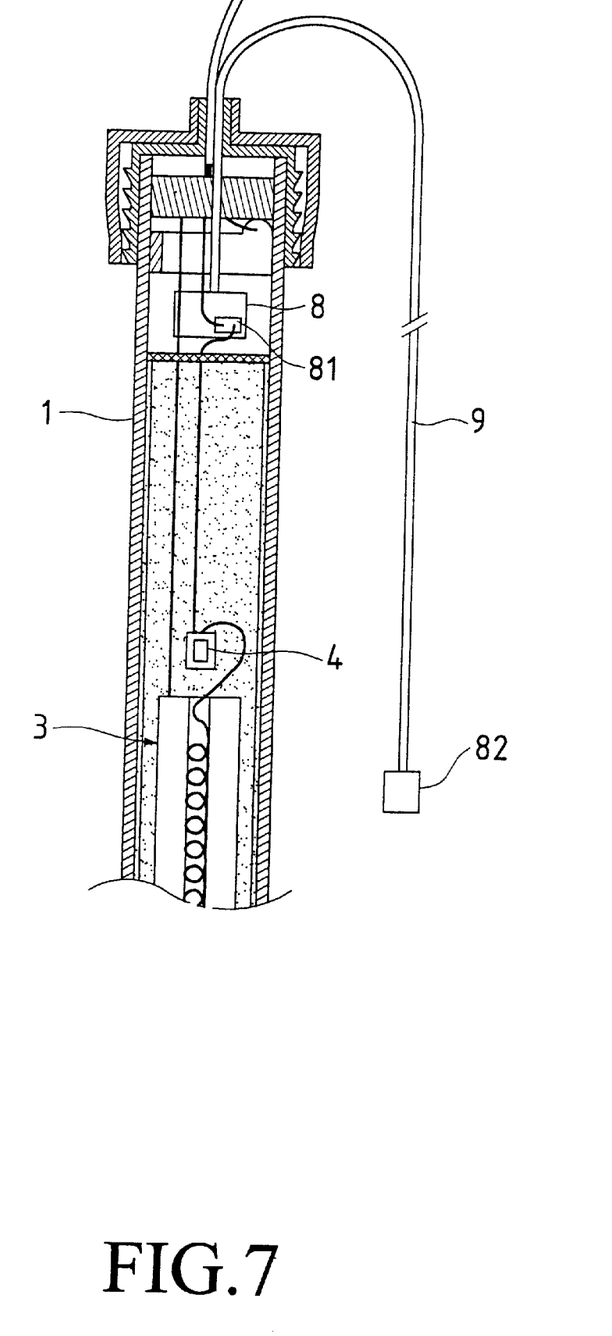
FIG. 7 shows that a microcomputer is added to the present invention to detect water temperature.

Please refer to FIG. 7. A thermal control circuit 8 can be added to the present invention. A relay 81 of the thermal control circuit 8 is serially connected with the thermal control switch 4 and the heater 3. A thermosensor 82 of the circuit 8 is placed into a hose 9 which is pulled out of the tube and placed into the water for detecting the water temperature and controlling the heating time of the heater. The thermal control circuit 8 can be a microcomputer preset with data for thermal control. For example, when the water temperature reaches 25, 26 or 28° C., the thermal control circuit 8 makes the heater turned off. In the case of low temperature, the thermal control circuit 8 makes the heater automatically heat the water. Therefore, a thermostat is formed to enhance the function of the present invention.

Figure 8:
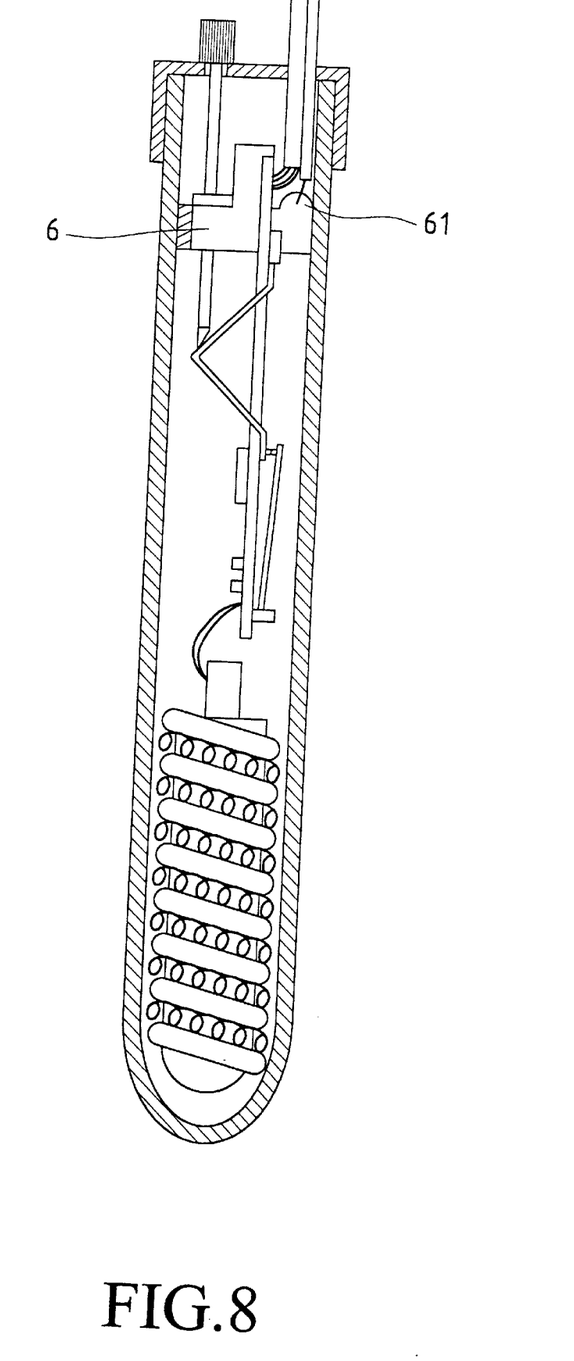
FIG. 8 shows that the heater is only equipped with the grounding mechanism.

As shown in FIG. 8, the grounding mechanism 6 of the present invention is a protection for leakage of electricity of the heater. Such grounding mechanism 6 can be solely arranged on various kinds of conventional heaters.

Figure 9:
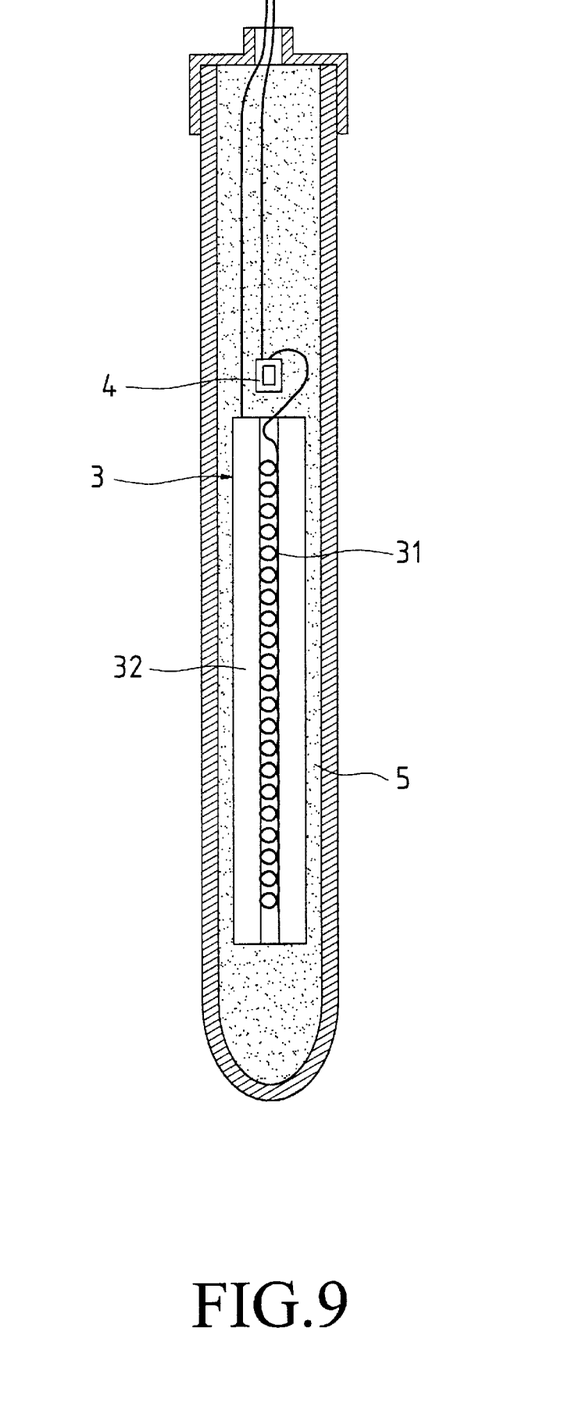
FIG. 9 shows that the heater is only equipped with the thermal control switch.

Referring to FIG. 9, similarly, the heater 3 and thermal control switch 4 can be separately used in various kinds of heaters. By means of these units, after separated from the water, the temperature of the conventional glass tube heater will not abruptly increase and the heater will be automatically turned off by the thermal control switch 4 to avoid cracking fissure due to great difference between internal and external temperatures.

It should be noted that the above description and accompanying drawings are only used to illustrate some embodiments of the present invention, not intended to limit the scope thereof Any modification of the embodiments should fall within the scope of the present invention.

What is claimed is:

1. A safety protection structure for an aquarium heater, comprising an anti-corrosion tube body receiving a grounding mechanism, an electric heater, a thermal control switch, multiple electrically insulative plates and multiple water-sealing members, wherein:

the grounding mechanism comprises an electrically conductive plate, the grounding mechanism having a wire connecting section;

the electric heater is made of a length of electric heating film which is wound around a heat-resistant carrier;

the thermal control switch is separately disposed adjacent to the heater for detecting the heating temperature of the heater so as to turn on or turn off the heater, whereby the grounding mechanism avoids leakage of electricity and the thermal control switch prevents the heater from continuously heating after the tube body is moved from the water, so that the tube body is protected from blowing up and over-heating to burn other articles and wherein the tube body is made of one of titanium, and stainless steel and has a bottom and inner wall disposed with isolating electrically insulative sheet for defining an electrically insulative receptacle for receiving the heater and the thermal control switch.

2. A safety protection structure for aquarium heating as claimed in claim 1, wherein the heater comprises:

a titanium tube having two open ends for receiving components of the heater;

the electrically insulative receptacle disposed in the titanium tube having a mica plate corresponding to an inner diameter of the titanium tube and a thin mica sheet which is rolled to define an electrically insulative layer;

the electric heater being formed by a heating film wound around a ceramic bar, the heater being controlled by the thermal control switch to be turned on or off;

the thermal control switch being a bimetal switch serially connected with the electric heater, the thermal control switch being separately disposed above the electric heater;

an anti-oxidation heat conductive layer disposed in the electrically insulative receptacle in which magnesium oxide powder coats the heater and the thermal control switch;

the grounding mechanism being formed by an electrically conductive plate having a C-shaped collar with a diameter larger than the inner diameter of the tube, the collar having a wire connecting section for attaching a grounding wire; and multiple water-sealing members including conic cock, upper isolating plate, upper and lower reinforcing layers, upper and lower sealing caps and out cap for water-sealing the titanium tube.

3. A safety protection structure as claimed in claim 2, wherein the conic cock is plugged into rear end of the titanium tube and fixedly sealed by silicone, a lower reinforcing layer of silicone with 10–13 mm thickness being filled under the conic cock, the lower sealing cap being tightly fitted around the tube and sealed by silicone, the mica plate being overlaid on the conic cock and the thin mica sheet being rolled into a cylindrical shape and placed into the tube to define the insulative receptacle, the grounding mechanism being placed into the insulative receptacle, the upper isolating plate being positioned above the grounding mechanism, silicon being filled in to form a water-sealing upper reinforcing layer with a thickness of 10–13 mm, the upper sealing cap being tightly sealed by the silicone, the outer cap being fixedly fitted around multiple soft annular ribs of the upper cap.

4. A safety protection structure as claimed in claim 3, wherein the mica plate has a thickness of 0.5 mm and the thin mica sheet has a thickness of 0.05 mm.

5. A safety protection structure as claimed in claim 4, further comprising a thermal control circuit added to the heater, a relay of the thermal control circuit being serially connected with the thermal control switch and the electric heater, a thermosensor of the thermal control circuit being placed into a hose which is pulled out of the tube and placed into water for detecting a water temperature and controlling the heating time of theater.

* * * * *